United States Patent
Shioiri et al.

(10) Patent No.: US 9,851,000 B2
(45) Date of Patent: Dec. 26, 2017

(54) POWER TRANSMISSION APPARATUS

(71) Applicant: TOYOTA JIDOSHA KABUSHIKI KAISHA, Toyota-shi, Aichi-ken (JP)

(72) Inventors: Hiroyuki Shioiri, Yokohama (JP); Yuki Kurosaki, Susono (JP); Hiroyuki Shibata, Odawara (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/248,204

(22) Filed: Aug. 26, 2016

(65) Prior Publication Data
US 2017/0059033 A1 Mar. 2, 2017

(30) Foreign Application Priority Data

Aug. 28, 2015 (JP) .................................. 2015-168916

(51) Int. Cl.
F16H 57/04 (2010.01)
B60K 6/365 (2007.10)
F16H 3/72 (2006.01)

(52) U.S. Cl.
CPC ......... *F16H 57/0473* (2013.01); *B60K 6/365* (2013.01); *F16H 3/724* (2013.01); *F16H 57/045* (2013.01); *F16H 57/0424* (2013.01); *F16H 57/0434* (2013.01); *F16H 57/0436* (2013.01); *B60Y 2200/92* (2013.01); *B60Y 2300/192* (2013.01); *B60Y 2306/03* (2013.01); *Y10S 903/915* (2013.01)

(58) Field of Classification Search
None
See application file for complete search history.

(56) References Cited

U.S. PATENT DOCUMENTS 2,333,161 A * 11/1943 Dunn .................... F16H 57/043
184/6.12
2009/0107769 A1 * 4/2009 Sato ....................... B60K 6/365
184/6.2

(Continued)

FOREIGN PATENT DOCUMENTS

JP 2015-077846 A 4/2015
JP 2016-037120 A 3/2016
WO 2015/056087 A1 4/2015

*Primary Examiner* — Justin Holmes
(74) *Attorney, Agent, or Firm* — Andrews Kurth Kenyon LLP

(57) ABSTRACT

A power transmission apparatus of a vehicle is provided. The power transmission apparatus includes: an input shaft; a brake mechanism; an oil pump; a housing case; a center support; a lubricating oil reservoir; and an oil passage. The brake mechanism includes a stationary race and a rotary race that are adjacently arranged in an axial direction of the input shaft. The center support is disposed between an inner surface of the housing case and the input shaft in the housing case. The center support is configured to support the input shaft relative to the housing case. The lubricating oil reservoir is disposed in a lubrication passage of the lubricating oil inside the housing case. The oil passage communicates the lubricating oil reservoir with the rotary race of the brake mechanism such that the lubricating oil reserved in the lubricating oil reservoir is supplied into the brake mechanism.

9 Claims, 4 Drawing Sheets

(56) References Cited

U.S. PATENT DOCUMENTS

2013/0152570 A1\* 6/2013 Hoshinoya ............. B60K 6/387
60/396
2014/0342868 A1\* 11/2014 Igarashi ............. F16H 57/0427
475/159

\* cited by examiner

POWER TRANSMISSION APPARATUS

INCORPORATION BY REFERENCE

The disclosure of Japanese Patent Application No. 2015-168916 filed on Aug. 28, 2015 including the specification, drawings and abstract is incorporated herein by reference in its entirety.

BACKGROUND OF THE INVENTION

1. Field of the Invention

Embodiments of the present invention relate to a power transmission apparatus.

2. Description of Related Art

There have been known hybrid vehicles (HV vehicles) equipped with engines and motors as driving power sources, and capable of carrying out the EV drive using only the motors while the engines are stopped. For example, Japanese Patent Application Publication No. 2015-77846 discloses a power transmission apparatus of a hybrid vehicle including a selectable one-way clutch (hereinafter, referred to as an SOWC) as a brake mechanism in a housing case (rear case). This power transmission apparatus supplies lubricating oil into the SOWC by a mechanical oil pump driven by an engine power.

SUMMARY

In the power transmission apparatus described above, the engine is stopped during the EV drive, and thus the mechanical oil pump is also stopped. Accordingly, the power transmission apparatus disclosed in JP2015-77846A might not be able to sufficiently supply the lubricating oil to the brake mechanism, such as the SOWC, during the EV drive.

Embodiments of the present invention provide a power transmission apparatus capable of supplying a sufficient amount of lubricating oil to a brake mechanism, such as an SOWC, even during the EV drive.

A power transmission apparatus of a vehicle according to one embodiment of the present invention is provided. The vehicle includes an engine and a motor as a driving power source. The vehicle is configured to travel using only the motor as the driving power source with the engine stopped. The power transmission apparatus includes: an input shaft; a brake mechanism; an oil pump; a housing case; a center support; a lubricating oil reservoir; and an oil passage. Power from the engine is inputted into the input shaft. The brake mechanism is arranged around the input shaft. The brake mechanism includes a stationary race and a rotary race that are adjacently arranged in an axial direction of the input shaft. The rotary race is configured to rotate along with rotation of the motor. The oil pump is configured to supply lubricating oil to the brake mechanism. The oil pump is configured to be driven by rotation of the input shaft. The housing case houses the input shaft, the brake mechanism, and the oil pump. The center support is disposed between an inner surface of the housing case and the input shaft in the housing case. The center support is configured to support the input shaft relative to the housing case. The lubricating oil reservoir is disposed in a lubrication passage of the lubricating oil inside the housing case. The oil passage communicates the lubricating oil reservoir with the rotary race of the brake mechanism such that the lubricating oil reserved in the lubricating oil reservoir is supplied into the brake mechanism.

According to the power transmission apparatus of this embodiment, the power transmission apparatus is capable of reserving the lubricating oil flowing through the inside of the housing case in the lubricating oil reservoir, and supplying the reserved lubricating oil to the brake mechanism through an oil passage. In the power transmission apparatus according to the above embodiment, in the housing case, the rotary race, the stationary race, and the center support may be adjacently arranged from one side toward the other side in the axial direction of the input shaft in an order from the rotary race, the stationary race to the center support. The lubricating oil reservoir may be disposed in a portion on the center support opposite to the stationary race in the axial direction. The oil passage may be so formed as to extend through the center support and the stationary race. According to the power transmission apparatus of this embodiment, during the EV drive, the rotary race of the brake mechanism rotates along with rotation of the motor, and an internal negative pressure is generated inside the brake mechanism due to difference in rotation between the rotary race and the stationary race. Hence, by utilizing this internal negative pressure, it is possible to introduce the lubricating oil from the lubricating oil reservoir through the oil passage into the braking mechanism. In addition, control on the difference in rotation frequency of the rotary race relative to the stationary race enables adjustment of the internal negative pressure in the brake mechanism; therefore, it is possible to readily control a supply amount of the lubricating oil to the brake mechanism, which has been difficult to be controlled in the related art.

In the power transmission apparatus according to the above embodiment, the lubricating oil reservoir may be a region partitioned by a surface of the center support opposite to the stationary race in the axial direction, and a shielding member covering the opposite surface.

According to the power transmission apparatus of this embodiment, the power transmission apparatus is capable of reserving the lubricating oil flowing through the inside of the housing case with a simple structure.

In the power transmission apparatus according to the above embodiment, the rotary race and the stationary race may be adjacently arranged in the axial direction of the input shaft in the housing case. The lubricating oil reservoir may be disposed in a portion on the stationary race opposite to the rotary race in the axial direction. The oil passage may extend through the stationary race.

According to the power transmission apparatus of this embodiment, it is possible to reserve the lubricating oil flowing through the inside of the housing case in the lubricating oil reservoir, and supply the reserved lubricating oil to the brake mechanism through the oil passage. During the EV drive, the rotary race of the brake mechanism rotates along with rotation of the motor, so that an internal negative pressure is generated inside the brake mechanism due to difference in rotation between the rotary race and the stationary race. Hence, by utilizing this internal negative pressure, it is possible to introduce the lubricating oil from the lubricating oil reservoir through the oil passage into the braking mechanism. In addition, control on the difference in rotation frequency of the rotary race relative to the stationary race enables adjustment of the internal negative pressure in the brake mechanism; therefore, it is possible to readily control a supply amount of the lubricating oil to the brake mechanism, which has been difficult to be controlled in the related art.

In the power transmission apparatus according to the above embodiment, in the housing case, the rotary race, the stationary race, and the center support may be adjacently arranged from one side toward the other side in the axial direction of the input shaft in an order from the rotary race, the stationary race to the center support. The stationary race and the center support may be adjacently disposed in one partial region of the stationary race and the center support in the axial direction of the input shaft. The stationary race and the center support may be disposed to face each other in other partial regions of the stationary race and the center support with a predetermined distance therebetween in the axial direction of the input shaft. The lubricating oil reservoir may be a region partitioned by other partial regions of the stationary race and the center support that face each other.

According to the power transmission apparatus of this embodiment, it is possible to reserve the lubricating oil flowing through the inside of the housing case with a simple structure without using any additional member.

In the power transmission apparatus of the above embodiment, in the housing case, the center support, the rotary race, and the stationary race may be adjacently arranged from the other side toward one side in the axial direction of the input shaft in an order from the center support, the rotary race to the stationary race. The lubricating oil reservoir may be a region partitioned by a surface of the stationary race opposite to the rotary race in the axial direction, and a shielding member disposed to face the opposite surface.

According to the power transmission apparatus of this embodiment, it is possible to reserve the lubricating oil flowing through the inside of the housing case with a simple structure.

In the power transmission apparatus of the above embodiment, the oil passage may include a first opening that opens toward the rotary race, and a second opening that opens toward the lubricating oil reservoir. The second opening may be disposed more radially outward of the input shaft than the first opening.

According to the power transmission apparatus of this embodiment, the oil passage is so formed as to have a difference in height relative to an oil level of the lubricating oil in the lubricating oil reservoir, thereby forming the oil passage to be inclined; therefore, even if the amount of the lubricating oil reserved in the lubricating oil reservoir is smaller, it is possible to efficiently supply the lubricating oil radially inward of the brake mechanism, thus promoting enhancement of the lubrication efficiency relative to the brake mechanism.

The power transmission apparatus of the above embodiment may further include a planetary gear mechanism disposed between the input shaft and the brake mechanism in the housing case. The brake mechanism may be disposed on an outer periphery of a ring gear in the planetary gear mechanism.

According to the power transmission apparatus of this embodiment, the brake mechanism is disposed on the outer periphery of the ring gear, thereby blocking the passage of the lubricating oil flowing from the inside of the planetary gear mechanism toward the outer periphery of the ring gear. Accordingly, it is possible to supply the lubricating oil only from the lubricating oil reservoir to the brake mechanism, thus facilitating control on the supply amount of the lubricating oil to the brake mechanism.

In the power transmission apparatus of the above embodiment, the stationary race and the center support may be fastened together to the housing case with a fastening member.

Through this, in the power transmission apparatus, coaxiality between the stationary race and the rotary race is enhanced, thus reducing meshing error between the stationary race and the rotary race.

According to the power transmission apparatus of the above embodiment, even during the EV drive, it is possible to supply a sufficient amount of the lubricating oil to the brake mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
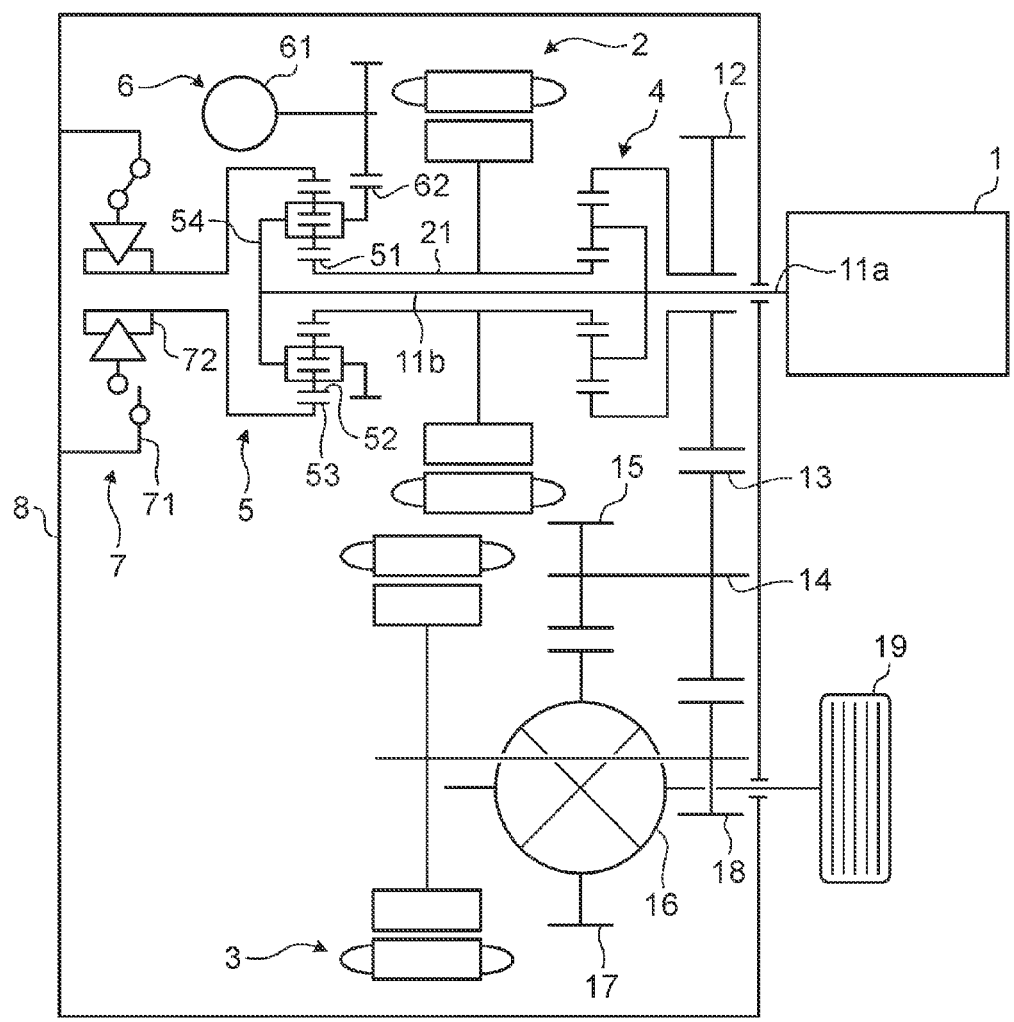
FIG. 1 is a skeleton view of a vehicle equipped with a power transmission apparatus according to embodiments of the present invention.
Figure 2:
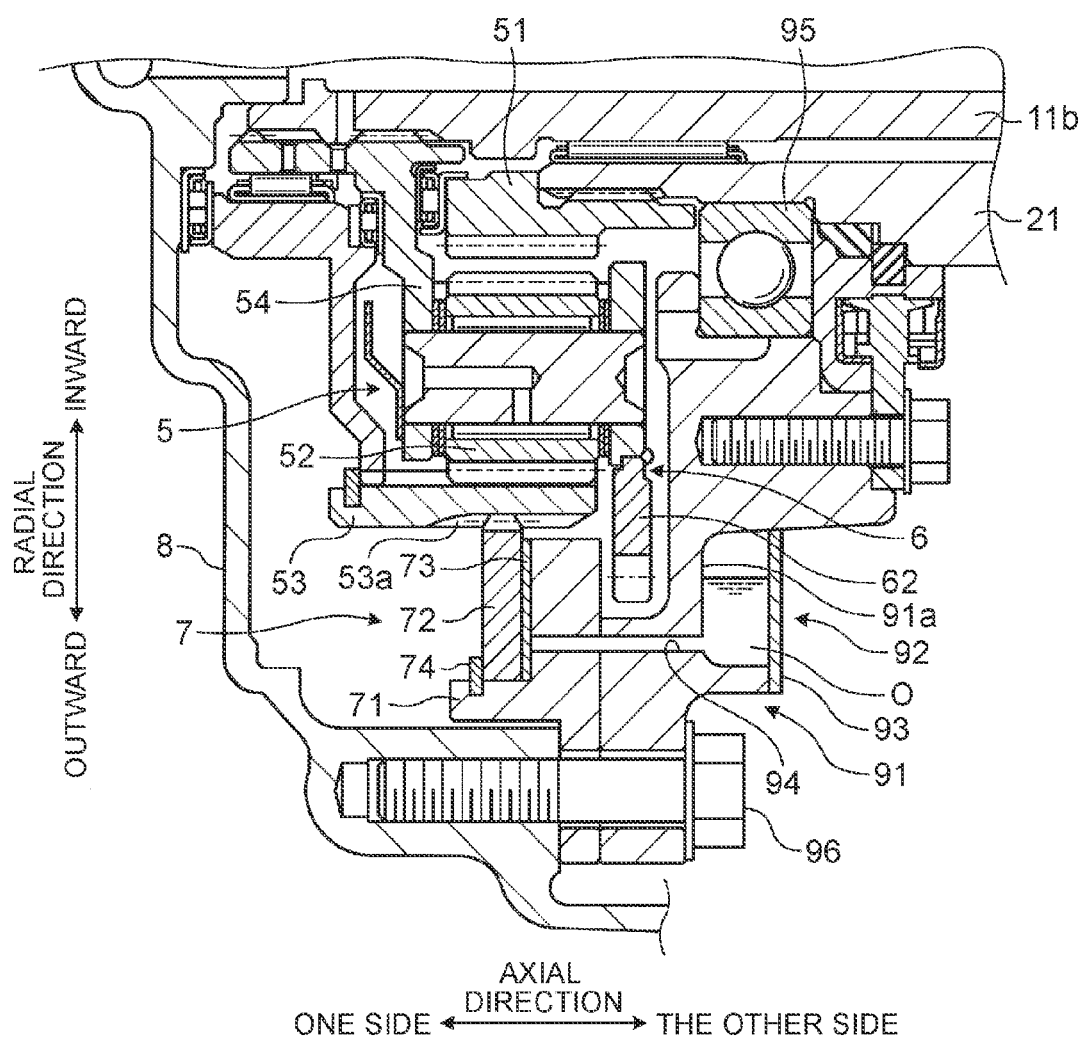
FIG. 2 is a sectional view showing a configuration of a power transmission apparatus according to a first embodiment of the present invention.
Figure 3:
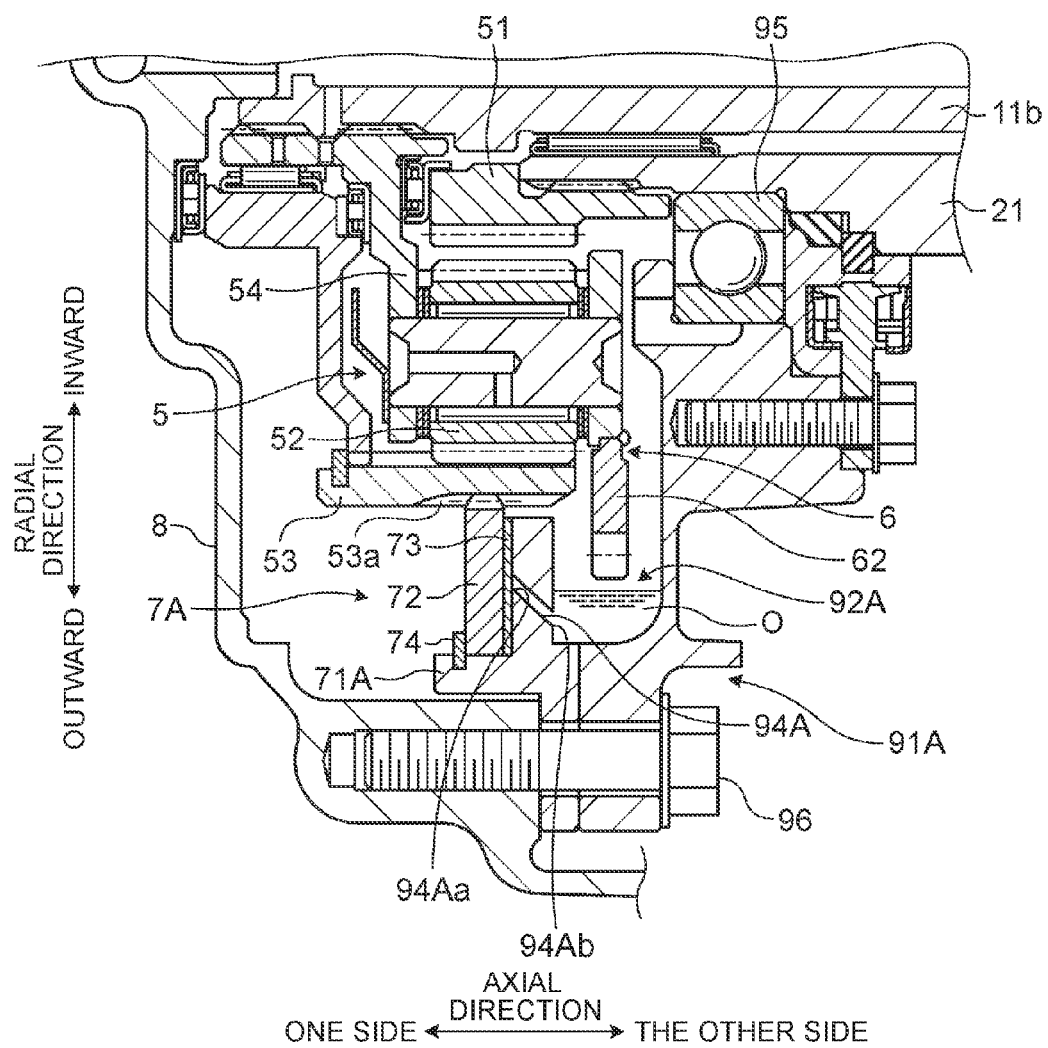
FIG. 3 is a sectional view showing a configuration of a power transmission apparatus according to a second embodiment of the present invention.
Figure 4:
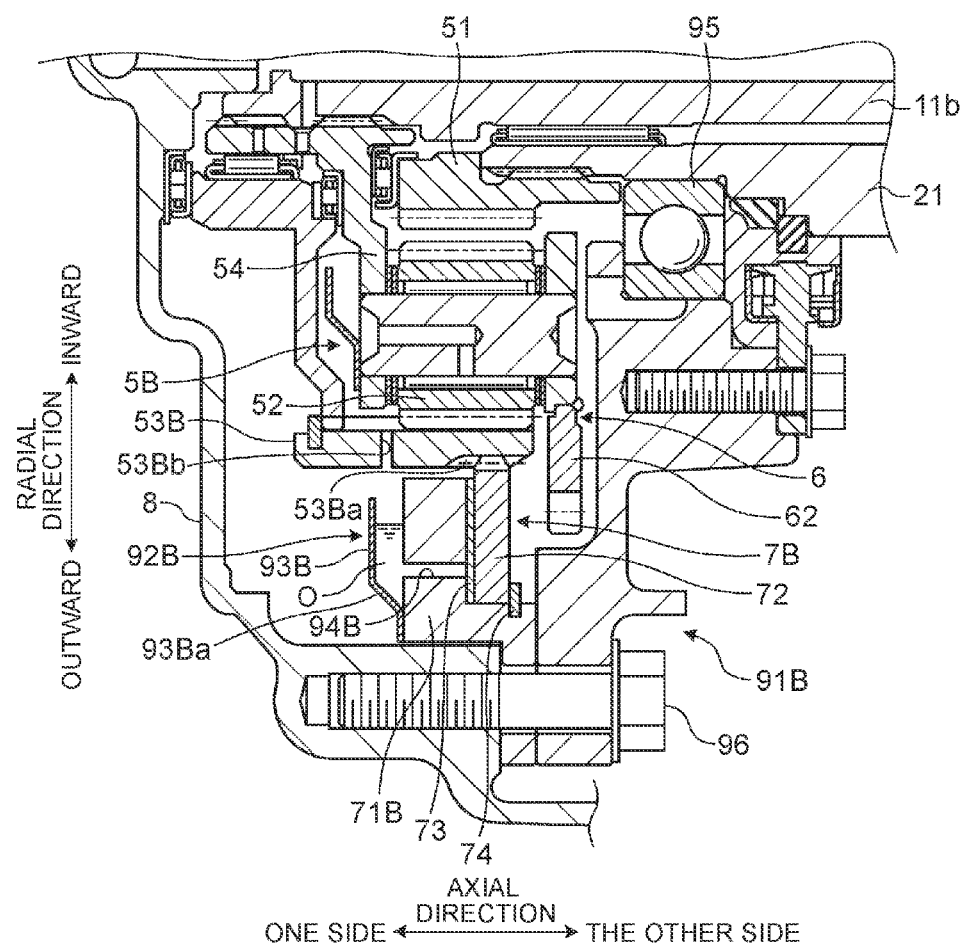
FIG. 4 is a sectional view showing a configuration of a power transmission apparatus according to a third embodiment of the present invention.

Each power transmission apparatus according to embodiments of the present invention will be described with reference to FIG. 1 to FIG. 4. Embodiments of the present invention are not limited to the following embodiments. Components in the following embodiments include components that are easily replaceable by those skilled in the art or substantially the same components. FIG. 1 as referred to below is a skeleton view of an entire vehicle equipped with each power transmission apparatus, and FIG. 2 to FIG. 4 are sectional views showing each part (lower half from an input shaft) of the respective power transmission apparatuses.

First Embodiment

A vehicle equipped with a power transmission apparatus according to a first embodiment is a hybrid vehicle (HV vehicle) or a plug-in hybrid vehicle (PHV vehicle) including an engine and a motor as a driving power source. As shown in FIG. 1, the vehicle equipped with the power transmission apparatus according to the present embodiment includes an engine 1, a first rotary machine (motor) 2, a second rotary machine (motor) 3, a single-pinion-type planetary gear mechanism 4 that is a first differential mechanism, a double-pinion-type planetary gear mechanism 5 that is a second differential mechanism, an oil pump 6, an SOWC 7 that is a brake mechanism, a rear case 8 that is a housing case, and a center support 91 (see FIG. 2).

The vehicle equipped with the power transmission apparatus of the present embodiment includes: an input shaft 11*b* that is connected to an output shaft 11*a* of the engine 1 so as to receive power inputted from the engine 1; a rotor shaft 21 of the first rotary machine 2 that includes the input shaft 11*b* extending through an inside of the rotor shaft 21, and is relatively rotatable relative to the input shaft 11*b*; a drive gear 12; a counter driven gear 13; a counter shaft 14; a counter drive gear 15; a differential 16; a ring gear 17; a drive gear 18; and driven wheels 19.

The power transmission apparatus according to the present embodiment at least includes: the engine 1; the second rotary machine 3; the input shaft 11*b*; the oil pump 6; the SOWC 7; the rear case 8; and the center support 91. The power transmission apparatus according to the present embodiment has two drive modes: an HV drive mode in which the vehicle travels using only the engine 1, or the engine 1 and the second rotary machine 3 as a driving power source; and an EV drive mode in which the vehicle travels using only the second rotary machine 3 as the driving power source with the engine stopped.

The planetary gear mechanism 4 is a power split mechanism to split the power outputted from the engine 1 into the first rotary machine 2 side and each driven wheel 19 side (output side), and includes a sun gear, pinion gears, a ring gear, and a carrier (reference numerals thereof are not indicated in FIG. 1). In the planetary gear mechanism 4, the sun gear is connected to the rotor shaft 21 of the first rotary machine 2, and the ring gear is connected to the drive gear 12 that is an output element, and the carrier is connected to the output shaft 11*a* of the engine 1.

As shown in FIG. 1, the planetary gear mechanism 5 includes a sun gear 51, a pinion gear 52, a ring gear 53, and a carrier 54. In the planetary gear mechanism 5, the sun gear 51 is connected to the rotor shaft 21 of the first rotary machine 2, the pinion gear 52 is connected to an oil pump drive gear 62, the ring gear 53 is connected to a notch plate 72 of the SOWC 7 as described later, and the carrier 54 is connected to the output shaft 11*a* of the engine 1. Between the sun gear 51 and the ring gear 53, another pinion gear (a reference numeral thereof is not indicated in FIG. 1) other than the pinion gear 52 is provided, and the carrier 54 holds these pinion gears in a manner as to allow these pinion gears to rotate around their own axes as well as rotate around the sun gear. As shown in FIG. 2, in the rear case 8, the planetary gear mechanism 5 is disposed around the input shaft 11*b*, and between the input shaft 11*b* and the SOWC 7.

The oil pump 6 is a mechanical oil pump to supply lubricating oil to respective components such as the SOWC 7 disposed inside the rear case 8. The oil pump 6 is driven by rotation of the input shaft 11*b* of the engine 1. As shown in FIG. 1 and FIG. 2, the oil pump 6 includes a pump body 61, and the oil pump drive gear 62 connected to the pump body 61 and the pinion gear 52.

The SOWC (brake mechanism) 7 restricts or permits rotation of a rotary element (the ring gear 53) of the planetary gear mechanism 5 so as to carry out switching between a THS mode and an OD lock mode, for example, in the HV drive mode. The THS mode is a mode in which a reaction force against the power of the engine 1 is generated by the first rotary machine 2 so as to drive the vehicle. The OD lock mode is a mode in which rotation of the carrier 54 of the planetary gear mechanism 5 is restricted so as to accelerate the rotation of the engine 1, and output this rotation to an output element (the drive gear 12) from the ring gear of the planetary gear mechanism 4.

As shown in FIG. 2, the SOWC 7 is disposed around the input shaft 11*b*, more specifically, on an outer periphery of the ring gear 53 of the planetary gear mechanism 5. The SOWC 7 includes a pocket plate 71 that is a stationary race, the notch plate 72 that is a rotary race, a selector plate 73 that is a switching member, and a snap ring 74 used for integrally assembling these components. The pocket plate 71, the notch plate 72, the selector plate 73, and the snap ring 74 are adjacently arranged in the axial direction of the input shaft 11*b*. Each of the pocket plate 71, the notch plate 72, the selector plate 73, and the snap ring 74 is generally formed in an annular shape around the axis of the input shaft 11*b*.

Herein, although not shown in FIG. 2, plural pockets recessed in the axial direction of the input shaft 11*b* are formed in a surface of the pocket plate 71 that faces the selector plate 73, and struts (engagement pieces) are installed thereinside. Plural notches (engagement recesses) corresponding to the struts are formed in a surface of the notch plate 72 that faces the selector plate 73. The selector plate 73 rotates around the axis of the input shaft 11*b*, thereby carrying out switching between an engagement state in which the struts are in engagement with the notches and a non-engagement state in which the struts are out of engagement with the notches.

As shown in FIG. 2, the rear case (housing case) 8 houses members, such as the input shaft 11*b*, the rotor shaft 21, the planetary gear mechanism 5, the oil pump 6, the SOWC 7, and the center support 91.

The center support 91 supports the input shaft 11*b* and the rotor shaft 21. As shown in FIG. 2, in the rear case 8, the center support 91 is disposed between an inner surface of the rear case 8 and the input shaft 11*b*.

A radially outer end of the center support 91 in the radial direction of the input shaft 11*b* is fixed to the inner surface of the rear case 8 via a fastening member 96, and a radially inner end of the center support 91 in the radial direction of the input shaft 11*b* is fixed to the rotor shaft 21 via a bearing member 95. Through this, the center support 91 supports the rotor shaft 21 via the bearing member 95. The rotor shaft 21 is a hollow shaft, and the input shaft 11*b* is disposed inside the rotor shaft 21 via a bearing member (a reference numeral thereof is not shown in FIG. 2). Accordingly, the center support 91 also supports the input shaft 11*b* via the bearing member 95, the rotor shaft 21, and the bearing member inside the rotor shaft 21. The center support 91 is generally formed in a disk shape around the axis of the input shaft 11*b*.

As shown in FIG. 1, the drive gear 12 is meshed with the counter driven gear 13. The counter shaft 14 is fixed to the counter driven gear 13, and the counter drive gear 15 having a smaller diameter than that of the counter driven gear 13 is fixed to the counter shaft 14. The counter drive gear 15 is meshed with the ring gear 17 of the differential 16 so as to output a driving torque from the differential 16 to the right and left driven wheels 19. The drive gear 18 is fixed to a rotor shaft (a reference numeral thereof is not indicated in FIG. 1) of the second rotary machine 3, and this drive gear 18 is meshed with the counter driven gear 13.

As aforementioned, in the power transmission apparatus of the related art, if the EV drive is carried out, the mechanical oil pump is also stopped in accordance with the stop of the engine; thus, sufficient lubricating oil cannot be supplied to the SOWC, and seizing might be caused to the SOWC 7 if an amount of supplied lubricating oil is excessively small. To cope with this, as shown in FIG. 2, the power transmission apparatus according to the present embodiment is configured to include a lubricating oil reservoir 92 to reserve the lubricating oil O in the vicinity of the SOWC 7, and supply the lubricating oil O reserved in this lubricating oil reservoir 92 into the SOWC 7.

As shown in FIG. 2, in the power transmission apparatus according to the present embodiment, the notch plate 72, the pocket plate 71, and the center support 91 are adjacently arranged in this order from one side toward the other side in the axial direction of the input shaft 11*b*. The lubricating oil reservoir 92 is disposed in a lubrication passage of the lubricating oil O in the rear case 8, and also on a side of the center support 91 opposite to the pocket plate 71.

The lubricating oil O supplied from the oil pump 6 flows from an axial center (the input shaft 11*b*, the rotor shaft 21) in the radial direction of the input shaft 11*b* via various paths; and the "lubrication passage of the lubricating oil O" including the lubricating oil reservoir 92 denotes a passage where the lubricating oil O flows in the order from the rotor shaft 21, the bearing member 95 to the center support 91. The "side of the center support 91 opposite to the pocket plate 71" denotes the other side in the axial direction of the input shaft 11*b*, as shown in FIG. 2.

The lubricating oil reservoir 92 is configured to be provided at the downstream of the lubrication passage of the lubricating oil O, that is, radially outward of the input shaft 11*b*, as shown in FIG. 2, so as to receive the lubricating oil O flowing radially outward of the input shaft 11*b* by centrifugal force. The lubricating oil reservoir 92 is provided at a position close to the SOWC 7 both in the axial direction and in the radial direction of the input shaft 11*b*.

As shown in FIG. 2, the lubricating oil reservoir 92 is a region (space) partitioned by a surface of the center support 91 opposite to the pocket plate 71 and a shielding member 93 covering this surface. More specifically, a groove portion 91*a* is formed in the surface of the center support 91 opposite to the pocket plate 71, and a predetermined space is provided therein. The shielding member 93 in a platy shape is so fixed as to cover this groove portion 91*a*. The center support 91 is arranged around the input shaft 11*b*, and thus the groove portion 91*a* is formed in an annular shape with a predetermined depth.

In this manner, the power transmission apparatus is capable of reserving the lubricating oil O flowing through the inside of the rear case 8 with a simple structure. As shown in FIG. 2, the lubricating oil reservoir 92 is shielded by the shielding member 93, thus promoting enhancement of sealing performance thereof. A reservation amount of the lubricating oil O reserved in the lubricating oil reservoir 92 can be adjusted by changing the dimension (depth) of the groove portion 91*a* of the center support 91.

As shown in FIG. 2, an oil passage 94 is formed between the lubricating oil reservoir 92 and the SOWC 7. The oil passage 94 is so formed as to extend through the center support 91 and the pocket plate 71 arranged between the lubricating oil reservoir 92 and the notch plate 72. The oil passage 94 is configured in this manner, thereby enabling the lubricating oil O reserved in the lubricating oil reservoir 92 to be supplied into the SOWC 7, more specifically, between the pocket plate 71 and the selector plate 73, and between the selector plate 73 and the notch plate 72. The oil passage 94 is formed in a circular shape having a predetermined diameter at a predetermined position in the center support 91 and the pocket plate 71 in FIG. 2.

The power transmission apparatus having the aforementioned configuration is capable of reserving the lubricating oil O flowing through the inside of the rear case 8 in the lubricating oil reservoir 92, and supplying the reserved lubricating oil O to the SOWC 7 through the oil passage 94. During the EV drive, a torque from the second rotary machine 3 is transmitted by rotation of the output shaft system, for example, so as to allow the notch plate 72 to rotate; thus an internal negative pressure is generated inside the SOWC 7 due to a difference in rotation between the notch plate 72 and the pocket plate 71. Accordingly, by utilizing this internal negative pressure, it is possible to introduce the lubricating oil O from the lubricating oil reservoir 92 through the oil passage 94 into the SOWC 7.

Hence, according to the power transmission apparatus of the present embodiment, even during the EV drive with the oil pump 6 stopped, it is possible to supply a sufficient amount of the lubricating oil O to the SOWC 7. In addition, by controlling the difference in rotation frequency of the notch plate 72 relative to the pocket plate 71 depending on the rotation frequency of the second rotary machine 3, it is possible to adjust the internal negative pressure in the SOWC 7; therefore, it is possible to readily control the supply amount of the lubricating oil O to the SOWC 7, which has been difficult to be controlled in the related art.

Herein, the power transmission apparatus according to the present embodiment also includes the following configuration. For example, as shown in FIG. 2, in the power transmission apparatus, the SOWC 7 is arranged on the outer periphery of the ring gear 53 in the planetary gear mechanism 5. Specifically, in the power transmission apparatus, the SOWC 7 is located more radially outward of the input shaft 11*b* than the planetary gear mechanism 5 while an inner periphery of the notch plate 72 is meshed with a spline 53*a* formed on the outer periphery of the ring gear 53.

Through this, in the power transmission apparatus, the notch plate 72 of the SOWC 7 is arranged on the outer periphery of the ring gear 53, thereby bringing the notch plate 72 to block the passage of the lubricating oil O flowing from the inside of the planetary gear mechanism 5 toward the outer periphery of the ring gear 53 by centrifugal force. Accordingly, it becomes easier to supply the lubricating oil O only from the lubricating oil reservoir 92 into the SOWC 7, thus facilitating control of the supply amount of the lubricating oil O to the SOWC 7.

During the EV drive, the supply amount of the lubricating oil O to the SOWC 7 is likely to be insufficient, but if the engine is started up at cold time, for example, the supply amount of the lubricating oil O to the SOWC 7 is likely to be excessive, contrary to during the EV drive. If the supply amount of the lubricating oil O to the SOWC 7 is excessive, a drag torque acting on the selector plate 73 becomes increased due to increase in amount of the oil, and thus malfunction of the selector plate 73 might occur, which might cause an erroneous engagement of the SOWC 7. Such an erroneous engagement of the SOWC 7 may make it difficult to start up the engine 1.

On the other hand, the power transmission apparatus according to the present embodiment has the aforementioned configuration, thereby blocking the passage of the lubricating oil O flowing from the inside of the planetary gear mechanism 5 toward the outer periphery of the ring gear 53 so as to prevent the lubricating oil O from being excessively supplied to the SOWC 7. Accordingly, the power transmission apparatus according to the present embodiment exerts effect to prevent an erroneous engagement of the SOWC 7 not only during the EV drive but also at the start-up of the engine at cold time.

In the power transmission apparatus according to the present embodiment, as shown in FIG. 2, the pocket plate 71 and the center support 91 are fastened together to an inner surface of the rear case 8 by the fastening member 96. Specifically, in the power transmission apparatus, the pocket plate 71 and the center support 91 are adjacently arranged radially outward of the input shaft 11*b*, and are both fastened together to the inner surface of the rear case 8 by the fastening member 96. As the fastening member 96, a bolt may be used. If fastening the pocket plate 71 and the center support 91 together, centering therebetween is carried out by using a knock pin, for example.

Through this, the power transmission apparatus has an improved coaxiality between the pocket plate 71 and the notch plate 72, thus reducing the engagement error between the pocket plate 71 and the notch plate 72.

In the engagement of the SOWC 7, it is preferable that the struts of the pocket plate 71 and the notches of the notch plate 72 come into mesh with each other with each two teeth thereof located at a position facing each other with the center axis interposed therebetween, that is, in double-teeth contact. However, in the power transmission apparatus of the related art, in consideration of facility of assembly, the pocket plate 71 is fixed to, e.g., the rear case 8 while play still remains (due to backlash at the time of spline-fitting; therefore, the coaxiality between the pocket plate 71 and the notch plate 72 becomes poorer.

Consequently, a pitch error between the struts of the pocket plate 71 and the notches of the notch plate 72 becomes greater, and the struts and the notches do not come into mesh in double-teeth contact, but are more likely to come into mesh in so-called single-tooth contact in which each single tooth thereof comes into contact with each other. Hence, in the power transmission apparatus of the related art, a radial load is generated between the pocket plate 71 and the notch plate 72 due to the above meshing in single-tooth contact, which might cause, e.g., eccentricity, deterioration of NV (Noise Vibration), and deterioration of strength and durability of members. To the contrary, the power transmission apparatus according to the present embodiment has the aforementioned configuration, thus suppressing generation of the meshing in single-tooth contact; therefore, it is possible to solve various problems resulting from the meshing in single-tooth contact.

In the power transmission apparatus of the related art, the pocket plate 71 is spline-fitted in the inner surface of the rear case 8, for example, and thus there is a concern about sliding abrasion due to the aforementioned play. Specifically, in the process of repetitive engagement-disengagement of the SOWC 7, the pocket plate 71 slides by the play, and this sliding is repeated along with the engagement-disengagement of the SOWC 7, thus causing increase in abrasion of the spline portion between the pocket plate 71 and the rear case 8, which results in increase in play.

Herein, such a concern about the above sliding abrasion can be eliminated by press-fitting the pocket plate 71, for example, but a material of the SOWC 7 is usually a sintered material; therefore, there is another concern about brittle fracture at the time of the press-fitting. If no sintered material is employed in the SOWC 7, portions to be machined in the manufacturing process becomes increased, which causes increase in manufacturing cost. To the contrary, the power transmission apparatus according to the present embodiment having the aforementioned configuration can reduce the play, thus preventing sliding abrasion of the SOWC 7 and increase in manufacturing cost.

Although not shown in FIG. 1 and FIG. 2, the selector plate 73 of the SOWC 7 is provided with an actuator to rotate the selector plate 73 around the axis of the input shaft 11b, and is separately provided with a stroke sensor to detect amount of stroke of this actuator (rotational rate of the selector plate 73), as well.

However, increase in amount of the play of the pocket plate 71 might cause increase in detection error of the stroke sensor, as aforementioned. Such a detection error of the stroke sensor can be solved by improvement of the sensor accuracy, reduction in play with a more strict manufacturing tolerance, and others, but this might cause increase in cost. To the contrary, the power transmission apparatus according to the present embodiment having the aforementioned configuration can reduce the play, thus preventing increase in detection error of the stroke sensor without causing increase in cost.

Second Embodiment

Hereinafter, a power transmission apparatus according to a second embodiment will be described. The power transmission apparatus according to the present embodiment is different from that of the first embodiment in the configurations of the lubricating oil reservoir 92 and the oil passage 94, and the other configurations are the same as those of the first embodiment.

As shown in FIG. 3, in the power transmission apparatus according to the present embodiment, the notch plate 72, a pocket plate 71A, and a center support 91A are adjacently arranged in this order from one side to the other side in the axial direction of the input shaft 11b. A lubricating oil reservoir 92A is disposed in the lubrication passage of the lubricating oil O in the rear case 8, and also on a side of the pocket plate 71A opposite to the notch plate 72.

The "lubrication passage of the lubricating oil O" including the lubricating oil reservoir 92A denotes a passage where the lubricating oil O flows in the order from the rotor shaft 21, the bearing member 95 to the center support 91A, as with the first embodiment. The "side of the pocket plate 71A opposite to the notch plate 72" denotes the other side in the axial direction of the input shaft 11b, as shown in FIG. 3.

The lubricating oil reservoir 92A is configured to be provided at the downstream of the lubrication passage of the lubricating oil O, that is, radially outward of the input shaft 11b, as shown in FIG. 3, so as to receive the lubricating oil O flowing radially outward of the input shaft 11b by centrifugal force. The lubricating oil reservoir 92A is provided at a position close to the SOWC 7A both in the axial direction and in the radial direction of the input shaft 11b.

As shown in FIG. 3, the lubricating oil reservoir 92A is a region (space) partitioned by the pocket plate 71A and a region in the center support 91A that faces the pocket plate 71A. More specifically, as shown in FIG. 3, the pocket plate 71A and the center support 91A are adjacently disposed in one partial region of the pocket plate 71A and the center support 91A in the axial direction of the input shaft 11b, and other partial regions thereof are so disposed as to face each other with a predetermined distance therebetween. Specifically, the pocket plate 71A and the center support 91A are adjacently disposed in their regions (regions radially outward of the input shaft 11b) fastened together with the fastening member 96.

On the other hand, the pocket plate 71A and the center support 91A are so disposed as to face each other with a predetermined space therebetween in the axial direction of the input shaft 11b in their regions radially inward of the input shaft 11b relative to their regions fastened together with the fastening member 96. The space formed by the pocket plate 71A and the center support 91A is set to be the lubricating oil reservoir 92A.

In this manner, the power transmission apparatus is capable of reserving the lubricating oil O flowing through the inside of the rear case 8 with a simple structure without using any additional member. Reservation amount of the lubricating oil O reserved in the lubricating oil reservoir 92A can be adjusted by changing the dimension of the space formed by the pocket plate 71A and the center support 91A.

As shown in FIG. 3, an oil passage 94A is formed between the lubricating oil reservoir 92A and the SOWC 7A. The oil passage 94A is so formed as to extend through the pocket plate 71A arranged between the lubricating oil reservoir 92A and the notch plate 72. The oil passage 94A is formed in this manner, thereby enabling the lubricating oil O reserved in the lubricating oil reservoir 92A to be supplied into the SOWC 7A, more specifically, between the pocket plate 71A and the selector plate 73, and between the selector plate 73 and the notch plate 72. The oil passage 94A is formed in a circular shape having a predetermined diameter at a predetermined position in the pocket plate 71A in FIG. 3.

As shown in FIG. 3, in the power transmission apparatus according to the present embodiment, the oil passage 94A is not formed to extend parallel in the axial direction of the input shaft 11b, but formed to be inclined relative to the radial direction of the input shaft 11b, as is different from the aforementioned first embodiment (see FIG. 2). Specifically, the oil passage 94A includes a first opening 94Aa opening toward the notch plate 72 side, and a second opening 94Ab opening toward the lubricating oil reservoir 92A side, and the second opening 94Ab is formed more radially outward of the input shaft 11b than the first opening 94Aa.

Inside the SOWC 7A, the lubricating oil O flows from radially inward to radially outward; therefore, it is preferable to supply the lubricating oil O as radially inward as possible of the SOWC 7A. This means that it is preferable to provide the first opening 94Aa of the oil passage 94A as radially inward as possible of the SOWC 7A. However, if the oil passage 94A is formed to be parallel, it is necessary to reserve the lubricating oil O at a higher position of the lubricating oil reservoir 92A.

To the contrary, in the power transmission apparatus according to the present embodiment, the oil passage 94A is so formed as to have a difference in height relative to an oil level of the lubricating oil O in the lubricating oil reservoir 92A, thereby forming the oil passage 94A to be inclined. Accordingly, even if the amount of the lubricating oil O reserved in the lubricating oil reservoir 92A is smaller, it is possible to efficiently supply the lubricating oil O radially inward of the SOWC 7A, thus promoting enhancement of the lubrication efficiency relative to the SOWC 7A.

If the oil level of the lubricating oil O in the lubricating oil reservoir 92A is higher, the oil pump drive gear 62 as shown in FIG. 3 is soaked in the lubricating oil O, which might cause increase in agitation loss and deterioration of fuel efficiency. To the contrary, in the power transmission apparatus according to the present embodiment, the oil passage 94A is so formed as to have a difference in height relative to the oil level so as to adjust the oil level of the lubricating oil O in the lubricating oil reservoir 92A to be lower, thereby preventing increase in agitation loss and deterioration of fuel efficiency. It should be noted that during the EV drive, while the pump body 61 is stopped, a torque is transmitted from the second rotary machine 3 by the rotation of the output shaft system, for example, so that the oil pump drive gear 62 is rotated, which causes the aforementioned agitation loss.

Third Embodiment

Hereinafter, a power transmission apparatus according to a third embodiment will be described. The power transmission apparatus according to the present embodiment is different from that of the first embodiment in the configurations of the lubricating oil reservoir 92 and the oil passage 94, and the other configurations are the same as those of the first embodiment.

As shown in FIG. 4, in the power transmission apparatus according to the present embodiment, a center support 91B, the notch plate 72, and a pocket plate 71B are adjacently arranged in this order from the other side to one side in the axial direction of the input shaft 11b. Specifically, the power transmission apparatus according to the present embodiment has a reverse arrangement of the pocket plate 71B and the notch plate 72 in the axial direction of the input shaft 11b to the arrangement of the first embodiment (see FIG. 2). A lubricating oil reservoir 92B is disposed in the lubrication passage of the lubricating oil O in the rear case 8, and also on a side of the pocket plate 71B opposite to the notch plate 72.

The "lubrication passage of the lubricating oil O" including the lubricating oil reservoir 92B denotes a passage where the lubricating oil O flows from the input shaft 11b, the sun gear 51, the pinion gear 52, and a ring gear 53B in this order, or a passage where the lubricating oil O flows from the input shaft 11b, the carrier 54, and the ring gear 53B in this order. In the present embodiment, as shown in FIG. 3, an oil passage 53Bb is formed in the ring gear 53B so as to introduce the lubricating oil O flowing through the lubrication passage into the lubricating oil reservoir 92B. The lubricating oil O flowing through the lubrication passage flows in the aforementioned lubrication passage radially outward of the input shaft 11b by centrifugal force, and is reserved in the lubricating oil reservoir 92B through the oil passage 53Bb of the ring gear 53B.

The lubricating oil reservoir 92B is configured to be provided at the downstream of the lubrication passage of the lubricating oil O, that is, radially outward of the input shaft 11b, as shown in FIG. 3, so as to receive the lubricating oil O flowing radially outward of the input shaft 11b by centrifugal force. The lubricating oil reservoir 92B is provided at a position close to the SOWC 7B both in the axial direction and in the radial direction of the input shaft 11b.

As shown in FIG. 4, the lubricating oil reservoir 92B is a region (space) partitioned by a surface of the pocket plate 71B on an opposite side to the notch plate 72 and a shielding member 93B facing this surface. More specifically, to the surface of the pocket plate 71B on the opposite side to the notch plate 72, there is fixed the shielding member 93B in a platy shape including a bent portion 93Ba that closes a side of the shielding member 93B in the radially outward direction of the input shaft 11b, and opens a side thereof in the radially inward direction of the input shaft 11b. The space formed by the shielding member 93B and the surface of the pocket plate 71B on the opposite side to the notch plate 72 is set to be the lubricating oil reservoir 92B.

In this manner, the power transmission apparatus is capable of reserving the lubricating oil O flowing through the inside of the rear case 8 with a simple structure. To be specific, an amount of reservation of the lubricating oil O reserved in the lubricating oil reservoir 92B can be adjusted by changing the position of the bent portion 93Ba of the shielding member 93B.

As shown in FIG. 4, an oil passage 94B is formed between the lubricating oil reservoir 92B and the SOWC 7B. The oil passage 94B is so formed as to extend through the pocket plate 71B arranged between the lubricating oil reservoir 92B and the notch plate 72. The oil passage 94B is formed in this manner, thereby enabling the lubricating oil O reserved in the lubricating oil reservoir 92B to be supplied into the SOWC 7B, more specifically, between the pocket plate 71B and the selector plate 73, and between the selector plate 73 and the notch plate 72. The oil passage 94B is formed in a circular shape having a predetermined diameter at a predetermined position in the pocket plate 71B in FIG. 4.

With respect to disposing the SOWC 7B on an outer periphery of the planetary gear mechanism 5B, the notch plate 72 is slidingly assembled to the ring gear 53B from the other side to one side in the axial direction of the input shaft 11b; but for example, With respect to the SOWC 7 of the first embodiment and the SOWC 7A of the second embodiment, as shown in FIG. 2 and FIG. 3, the notch plate 72 is disposed on one side in the axial direction of the input shaft 11b relative to each pocket plate 71, 71A, so that the spline 53a formed on the outer periphery of the ring gear 53 becomes longer, which requires a longer time for the assembly.

To the contrary, with respect to the SOWC 7B according to the present embodiment, as shown in FIG. 4, the notch plate 72 is disposed on the other side in the axial direction of the input shaft 11b relative to the pocket plates 71B, and thus the spline 53Ba formed on the outer periphery of the ring gear 53B becomes shorter than the SOWC 7 and SOWC 7A according to the first and the second embodiments, thus enhancing assemblability.

With respect to the power transmission apparatus according to the present embodiment, since the oil pump drive gear 62 is located apart from the lubricating oil reservoir 92B, there is no concern about increase in agitation loss due to soaking of the oil pump drive gear 62 in, e.g., the lubricating oil O, as described in the second embodiment.

As aforementioned, a power transmission apparatus according to embodiments of the present invention is not intended to be limited to the embodiments described above, and shall be construed broadly based on the description of the scope of the claims. Moreover, various changes and modifications that are made based on these descriptions may be included in embodiments of the present invention.

For example, in each power transmission apparatus of the first to third embodiments, as an example of the brake mechanism, using each of the SOWC 7, the SOWC 7A, and the SOWC 7B is introduced, but an electromagnetic dog clutch may be used as the brake mechanism. If an electromagnetic dog clutch is used, a hub of the electromagnetic dog clutch is equivalent to the stationary race, and a piece of the electromagnetic dog clutch is equivalent to the rotary race.

The power transmission apparatus according to the second embodiment is configured such that the oil passage 94A is inclined in the radial direction of the input shaft 11b; and the oil passages 94, 94B of the power transmission apparatuses according to the first and the third embodiments may also be configured to be inclined relative to the radial direction of the input shaft 11b. Through this, even if the amount of the lubricating oil O reserved in each lubricating oil reservoir 92, 92B is smaller, it is possible to efficiently supply the lubricating oil O radially inward of each SOWC 7, SOWC 7B, thus promoting enhancement of lubrication efficiency relative to each SOWC 7, SOWC 7B.

The power transmission apparatus according to the second embodiment is configured to have the oil passage 94A inclined so as to adjust the oil level of the lubricating oil O in the lubricating oil reservoir 92A to be lower, thereby attaining effect to prevent increase in agitation loss caused by the oil pump drive gear 62; however, in each power transmission apparatus according to the first and the third embodiments, the oil pump drive gear 62 is not soaked in the lubricating oil O, thus causing no problem regarding the aforementioned agitation loss.

What is claimed is:

1. A power transmission apparatus of a vehicle, the vehicle including an engine and a motor as a driving power source, the power transmission apparatus comprising:
   an input shaft into which power from the engine is inputted;
   a brake mechanism arranged around the input shaft, the brake mechanism including a stationary race and a rotary race that are adjacently arranged in an axial direction of the input shaft, the rotary race configured to rotate along with rotation of the motor;
   an oil pump configured to supply lubricating oil to the brake mechanism, the oil pump configured to be driven by rotation of the input shaft;
   a housing case housing the input shaft, the brake mechanism, and the oil pump inside the housing case;
   a center support disposed between an inner surface of the housing case and the input shaft in the housing case, the center support configured to support the input shaft relative to the housing case;
   a lubricating oil reservoir disposed in a lubrication passage of the lubricating oil inside the housing case; and
   an oil passage communicating the lubricating oil reservoir with the rotary race of the brake mechanism such that the lubricating oil reserved in the lubricating oil reservoir is supplied into the brake mechanism.

2. The power transmission apparatus according to claim 1, wherein
   in the housing case, the rotary race, the stationary race, and the center support are adjacently arranged from one side toward the other side in the axial direction of the input shaft,
   the lubricating oil reservoir is disposed in a portion on the center support opposite to the stationary race in the axial direction, and
   the oil passage extends through the center support and the stationary race.

3. The power transmission apparatus according to claim 2, wherein
   the lubricating oil reservoir is a region partitioned by a surface of the center support opposite to the stationary race in the axial direction, and a shielding member covering the surface of the center support opposite to the stationary race in the axial direction.

4. The power transmission apparatus according to claim 1, wherein
   the rotary race and the stationary race are adjacently arranged in the axial direction of the input shaft in the housing case,
   the lubricating oil reservoir is disposed in a portion on the stationary race opposite to the rotary race in the axial direction, and
   the oil passage extends through the stationary race.

5. The power transmission apparatus according to claim 4, wherein
   in the housing case, the rotary race, the stationary race, and the center support are adjacently arranged from one side toward the other side in the axial direction of the input shaft,
   the stationary race and the center support are adjacently disposed in one partial region of the stationary race and the center support in the axial direction of the input shaft,
   the stationary race and the center support are disposed to face each other in other partial regions of the stationary race and the center support with a predetermined distance between the stationary race and the center support in the axial direction of the input shaft, and the lubricating oil reservoir is a region partitioned by other partial regions of the stationary race and the center support that face each other.

6. The power transmission apparatus according to claim 4, wherein in the housing case, the center support, the rotary race, and the stationary race are adjacently arranged from the other side toward one side in the axial direction of the input shaft, and the lubricating oil reservoir is a region partitioned by a surface of the stationary race opposite to the rotary race in the axial direction, and a shielding member disposed to face the surface of the stationary race opposite to the rotary race in the axial direction.

7. The power transmission apparatus according to claim 1, wherein the oil passage includes a first opening that opens toward the rotary race, and a second opening that opens toward the lubricating oil reservoir.

8. The power transmission apparatus according to claim 1, further comprising:

a planetary gear mechanism disposed between the input shaft and the brake mechanism in the housing case, wherein the brake mechanism is disposed on an outer periphery of a ring gear in the planetary gear mechanism.

9. The power transmission apparatus according to claim 1, wherein the stationary race and the center support are fastened together to the housing case with a fastening member.

* * * * *